(12) United States Patent
Wallmeier et al.

(10) Patent No.: US 10,246,062 B2
(45) Date of Patent: Apr. 2, 2019

(54) SEMI-TRAILER LANDING GEAR

(71) Applicant: SAF-HOLLAND GmbH, Bessenbach (DE)

(72) Inventors: Stefan Wallmeier, Goldbach (DE); Reinhold Riedl, Berlin (DE)

(73) Assignee: SAF-HOLLAND GmbH, Bessenbach (DE)

( * ) Notice: Subject to any disclaimer, the term of this patent is extended or adjusted under 35 U.S.C. 154(b) by 0 days.

(21) Appl. No.: 15/111,579

(22) PCT Filed: Jan. 13, 2015

(86) PCT No.: PCT/EP2015/050455
§ 371 (c)(1),
(2) Date: Jul. 14, 2016

(87) PCT Pub. No.: WO2015/107033
PCT Pub. Date: Jul. 23, 2015

(65) Prior Publication Data
US 2016/0325717 A1   Nov. 10, 2016

(30) Foreign Application Priority Data
Jan. 14, 2014 (DE) .................. 10 2014 200 486

(51) Int. Cl.
*B60S 9/04* (2006.01)
*B60S 9/22* (2006.01)
*B60S 9/08* (2006.01)

(52) U.S. Cl.
CPC . *B60S 9/22* (2013.01); *B60S 9/04* (2013.01); *B60S 9/08* (2013.01)

(58) Field of Classification Search
CPC ...... B60S 9/00; B60S 9/04; B60S 9/06; B60S 9/08; B60S 9/10–9/22
See application file for complete search history.

(56) References Cited

U.S. PATENT DOCUMENTS

| 4,084,789 A | * | 4/1978 | Francis | ..................... B60S 9/04 254/418 |
| 4,402,526 A | * | 9/1983 | Huetsch | ..................... B60S 9/08 280/766.1 |

(Continued)

FOREIGN PATENT DOCUMENTS

| DE | 29817050 | 2/1999 |
| DE | 102005034552 | 2/2007 |

(Continued)

OTHER PUBLICATIONS

European Patent Office, International Search Report, dated Apr. 2, 2015.

*Primary Examiner* — Erez Gurari
(74) *Attorney, Agent, or Firm* — Price Heneveld LLP (57) ABSTRACT

A semi-trailer landing gear, in particular for trailers of utility vehicles, wherein the semi-trailer landing gear extends along a longitudinal axis and comprises an outer supporting tube and/or a transmission box, wherein the outer supporting tube and/or the transmission box comprise an outer wall, and wherein the outer wall comprises a fastening side, wherein at least one fastening portion is formed in the region of the fastening side, and wherein the fastening portion is designed to fasten and/or to arrange the semi-trailer landing gear on a further element, in particular a trailer, characterized in that a transmission is arranged in the transmission box, which transmission is coupled to a spindle drive, in that the fastening portion comprises at least one fastening element, and/or in that the fastening portion comprises at least one arrangement portion for arranging and/or fastening the at least one fastening element, and in that a ratio of a distance between the fastening elements and/or the arrangement portions of two fastening portions transversely to the longitudinal axis of the semi-trailer landing gear to a width of (Continued)

the transmission box or the outer supporting tube in this region is less than 1.

20 Claims, 8 Drawing Sheets

(56) References Cited

U.S. PATENT DOCUMENTS

| | | | | |
|---|---|---|---|---|
| 4,635,904 | A * | 1/1987 | Whittingham | B60S 9/08 192/56.62 |
| 4,969,631 | A * | 11/1990 | Whittingham | B60S 9/08 254/425 |
| 5,238,266 | A * | 8/1993 | VanDenberg | B60S 9/08 248/188.4 |
| 5,348,258 | A | 9/1994 | Rasmussen | |
| 5,538,225 | A * | 7/1996 | VanDenberg | B60S 9/08 254/419 |
| 5,727,767 | A * | 3/1998 | Jefrey | B60S 9/22 248/354.3 |
| 5,911,437 | A * | 6/1999 | Lawrence | B60S 9/10 254/419 |
| 7,044,445 | B1 * | 5/2006 | Crawford | B60S 9/08 254/425 |
| 9,809,072 | B2 * | 11/2017 | Beck | B60D 1/665 |
| 2003/0042707 | A1 * | 3/2003 | McCarty | B60D 1/246 280/477 |
| 2004/0159826 | A1 | 8/2004 | Peschmann et al. | |
| 2004/0159827 | A1 * | 8/2004 | Drake, III | B60S 9/08 254/425 |
| 2004/0262882 | A1 | 12/2004 | Huddleston | |
| 2005/0253345 | A1 * | 11/2005 | Riedl | B60S 9/08 280/6.153 |
| 2007/0182149 | A1 * | 8/2007 | Belliveau | B60S 9/08 280/766.1 |
| 2009/0057633 | A1 * | 3/2009 | Beck | B60D 1/66 254/420 |
| 2009/0090896 | A1 * | 4/2009 | Muller | B60S 9/08 254/419 |
| 2010/0117038 | A1 * | 5/2010 | Pinnell | B60D 1/66 254/420 |
| 2010/0133783 | A1 | 6/2010 | Walstrom et al. | |
| 2013/0087749 | A1 * | 4/2013 | Hsieh | B60S 9/08 254/100 |
| 2014/0048759 | A1 * | 2/2014 | Seidel | B60D 1/155 254/419 |
| 2014/0246637 | A1 * | 9/2014 | Anderson | B60S 9/18 254/425 |
| 2014/0367625 | A1 * | 12/2014 | Arakelian | B60S 9/18 254/418 |
| 2014/0367626 | A1 * | 12/2014 | Okerlund | B60S 9/18 254/420 |
| 2015/0197220 | A1 * | 7/2015 | Lusty | B60S 9/08 254/420 |
| 2016/0129892 | A1 * | 5/2016 | Pitts | B60S 9/04 280/764.1 |
| 2016/0229379 | A1 * | 8/2016 | Van Den Bos | B60S 9/04 |
| 2016/0325717 | A1 * | 11/2016 | Wallmeier | B60S 9/08 |
| 2017/0232941 | A1 * | 8/2017 | Preuss | B60S 9/04 280/763.1 |
| 2017/0326691 | A1 * | 11/2017 | Harper | B60S 9/10 |
| 2017/0356533 | A1 * | 12/2017 | Smith, Sr. | F16H 37/02 |

FOREIGN PATENT DOCUMENTS

| | | |
|---|---|---|
| DE | 202009014883 | 3/2010 |
| DE | 202010008603 | 11/2010 |
| EP | 1595761 | 11/2005 |
| WO | 2009067091 | 5/2009 |

* cited by examiner

SEMI-TRAILER LANDING GEAR

BACKGROUND OF THE INVENTION

The present invention relates to semi-trailer landing gears, in particular for trailers of utility vehicles.

Semi-trailer landing gears of the type in question are known in principle from the prior art. They are used primarily to support trailers, for example of utility vehicles. In the case of the known semi-trailer landing gears a plate is usually attached to a rear side of an outer supporting tube of the semi-trailer landing gear, said plate being used to fasten the semi-trailer landing gear to the trailer, for example. This plate is of such a size that it protrudes past the outer supporting tube to the left and right (i.e. transversely to the directions in which the semi-trailer landing gear is retracted and extended) so as to receive there a row of vertically arranged fastening screws in corresponding holes in the plate. This means that a plate of this type results unfavorably in an increased material requirement on account of its thickness and the lateral projections. In addition, the arrangement and positioning of a plate of this type requires an additional assembly step during manufacture. The assembly of the semi-trailer landing gear on the trailer is also complex, since with the known semi-trailer landing gears separate fastening means are always required, for example in the form or screws or bolts.

The object of the present invention is therefore to provide semi-trailer landing gears, in particular for utility vehicle trailers, that can be produced economically and can be easily assembled and handled and at the same time are lightweight.

SUMMARY OF THE INVENTION

In accordance with the invention a semi-trailer landing gear, in particular for trailers of utility vehicles, is provided, wherein the semi-trailer landing gear extends along a longitudinal axis and comprises an outer supporting tube and/or a transmission box, wherein the outer supporting tube and/or the transmission box comprise/comprises an outer wall, and wherein the outer wall comprises a fastening side, wherein at least one fastening portion is formed in the region of the fastening side, and wherein the fastening portion is designed to fasten and/or to arrange the semi-trailer landing gear on a further element, in particular a trailer. An inner supporting tube expediently is arranged or can be arranged within the outer supporting tube and can be moved along the longitudinal axis. By moving the inner supporting tube, a supporting height of the semi-trailer landing gear is ultimately adjusted. Whereas the outer supporting tube and/or the transmission box of the semi-trailer landing gear thus can be fastened advantageously via its/their fastening side to the trailer, the inner supporting tube can be supported on the ground, preferably via a foot, which is (movably) arranged accordingly at the lower end of the inner supporting tube. The semi-trailer landing gear and in particular the inner supporting tube is driven or actuated preferably via a hand crank or the like. A spindle drive or the like is advantageously used in order to transmit the rotary movement of the hand crank or generally of an input shaft of the semi-trailer landing gear. The spindle drive is advantageously coupled to a transmission arranged in the transmission box. The outer supporting tube and/or the transmission box advantageously have/has a substantially quadrangular, in particular also square cross section, as considered transversely to the longitudinal axis or along the longitudinal axis. In other words, the outer supporting tube and/or the transmission box consequently have/has four sides or side faces, wherein the side amongst the four sides facing towards the further element, i.e. the element on which the semi-trailer landing gear is to be arranged, is referred to as the fastening side. It goes without saying that the fastening side for geometric reasons has a certain width substantially transversely to the longitudinal axis. The width expediently defines the region of the fastening side that forms the at least one fastening portion. This means that the region of the fastening side which forms the at least one fastening portion is also only as wide as the outer supporting tube or the transmission box. Here, the maximum width of the transmission box or of the outer supporting tube is not necessarily used as a basis. This can be formed quite differently along the longitudinal axis (although a maximum width of the outer supporting tube or of the transmission box is preferably decisive). What is key is the region in which the fastening portions are arranged, so that the fastening portions by way of example do not protrude past the outer supporting tube and/or the transmission box to the left and/or right, or are arranged therebeside. The outer wall is preferably a sheet metal formed from aluminum or steel. Here, the outer wall of the outer supporting tube or of the transmission box can be formed substantially in one part. However, it may also be a welded structure. The fastening side or the outer wall in this region does not have to be smooth or flat, but where appropriate can also have protrusions and/or recesses, which for example can facilitate the arrangement of the semi-trailer landing gear on the further element or can improve the flow of forces during this process.

The fastening portion is expediently formed by the outer wall and/or by a reinforcement element, which is arranged on the fastening side. The fastening portion is thus advantageously formed by the outer wall itself, which is advantageous in particular in respect of the material requirement, since there is no need for an additional plate or the like to be welded on. It is likewise preferred if the fastening portion can also be formed by the reinforcement element or by the combination of the outer wall with the reinforcement element. It goes without saying that the reinforcement element, generally similarly to the fastening portion, is expediently dimensioned to be as small as possible under consideration of the loads that occur. This applies both in respect of the area and in respect of the thickness. The reinforcement element is advantageously formed from steel or sheet aluminum with a wall thickness in a range from approximately 0.3 to 3.0 cm, preferably in a range from 0.5 to 2.5 cm, and most preferably in a range from 0.6 to 1.5 cm. The reinforcement element advantageously has a substantially rectangular form, wherein the long side of the rectangle extends advantageously along the longitudinal axis. A ratio of the long side to the short side is expediently approximately 1:1, and is more preferably approximately greater than approximately 3:1, and quite particularly preferably is greater than approximately 5:1. It is likewise preferred for a fastening plate to also be arranged on the outer wall, in particular on the outer supporting tube, wherein the fastening plate advantageously forms or comprises the at least one fastening portion. The fastening plate is also preferably manufactured from steel or aluminum and is preferably connected to the outer supporting tube in an interlocking and/or frictionally engaged manner. A plurality of fastening plates can also be provided, which are arranged on the semi-trailer landing gear or on the outer supporting tube thereof along the longitudinal axis.

A wall thickness of the fastening portion is preferably greater than a wall thickness of the outer wall, wherein the wall thickness of the fastening portion can be determined in particular by an arrangement of the reinforcement element and/or a reshaping of the outer wall, wherein the reshaping can result in a doubling of the outer wall. Here, the ratio of the wall thickness of the fastening portion to the wall thickness of the outer wall is formed advantageously in particular. In view of the weight of the semi-trailer landing gear and the forces that occur or weights that are to be supported in the case of (utility vehicle) trailers, it is advantageous when the wall thickness of the fastening portion is approximately 1.1 to 1.5 times greater than the wall thickness of the outer wall, preferably approximately 1.5 to 2.5 times greater, and again preferably approximately 2.5 to 3.5 times greater. It goes without saying that when determining the wall thickness of the fastening portion a wall thickness of the reinforcement element is included when this is fastened to the outer wall, in such a way that the outer wall together with the reinforcement element forms the fastening portion. However, it may also be the case that only the outer wall or only the reinforcement element forms the fastening portion. The specified measurements then apply analogously. The outer wall is advantageously also reshaped or bent in the region of the fastening side in such a way that a fastening portion can be formed, and in such a way that this has a wall thickness greater than the wall thickness of the outer wall itself. For this purpose, the outer wall is reshaped by means of suitable reshaping methods in such a way that the outer wall is "doubled" at least in regions. Fastening portions can in this way be formed purposefully and in regions on the fastening side of the semi-trailer landing gear in an expedient manner.

A semi-trailer landing gear is expediently provided, wherein the fastening portion comprises at least one fastening element, and/or wherein the fastening portion comprises at least one arrangement portion in order to arrange and/or fasten the least one fastening element, wherein a ratio of a distance between the fastening elements and/or arrangement portions of two fastening portions transversely to the longitudinal axis of the semi-trailer landing gear to a width of the transmission box and/or the outer supporting tube in this region is less than 1. It goes without saying that the distance between the fastening portions or the fastening elements/arrangement portions is adapted or corresponds to the existing measurements and dimensions provided at the trailers for the arrangement of semi-trailer landing gears. The fastening portion thus advantageously has at least one fastening element or at least one arrangement portion. However, the fastening portion can likewise also comprise at least one fastening element and at least one arrangement portion. Here, the fastening element expediently has the form of a bolt or pin. A fastening element of this type is advantageously connected to the fastening element so as not to be releasable, for example is connected in an integrally bonded manner via a welded joint. An arrangement portion does not necessarily have to be provided for this purpose. However, the fastening element can also be arranged in the arrangement portion, wherein a distinction must then be made as to whether or not the fastening element and the arrangement portion are fastened non-releasably, for example via a welded joint. The semi-trailer landing gear thus expediently offers three assembly variants, wherein in the first (i) assembly variant the fastening portion or fastening portions has/have one or more fastening elements which is/are connected to the fastening portion(s) in a (immovably) fixed and non-releasable manner. These fastening elements, which advantageously are provided with a thread, are inserted into corresponding holes in the further element, referred to hereinafter as the trailer by way of simplicity, and can be screwed on there. In a second (ii) assembly variant the trailer has corresponding, fixedly arranged bolts, pins or threads, which can be inserted into the arrangement portions of the one or more fastening portions. The fastening is then provided preferably by means of corresponding nuts or pins. As a third (iii) assembly variant, provision is made for the fastening portions and the trailer (or the further element) to have one or more arrangement portions, wherein the fastening is provided with use of corresponding screws, bolts, pins or the like. In this case neither the trailer nor the semi-trailer landing gear thus has "fixedly" arranged fastening means. However, it goes without saying that combinations of the assembly variants (i), (ii) and (iii) are also possible. The fastening portion advantageously has a preferably even-numbered multiplicity of fastening elements and/or arrangement portions, for example 2, 4, 6, 8 or more fastening elements and/or arrangement portions. The arrangement portion itself is advantageously round, in particular circular, and/or oval, wherein the arrangement portion is fundamentally configured such that the fastening element, which is preferably formed as a bolt, screw or pin, can be arranged in the arrangement portion. Two fastening portions are advantageously formed on the outer supporting tube or on the transmission box and extend advantageously along the longitudinal axis, wherein the multiplicity of fastening elements or arrangement portions extends along the longitudinal axis. The above-mentioned ratio of the distance between the fastening elements and/or the arrangement portions also advantageously lies in a range from 0.7 to 0.9. As a result of the ratio, which is less than 1, the fastening portions are advantageously formed only in the region of the fastening side of the semi-trailer landing gear and do not protrude laterally. It goes without saying that a plurality of fastening portions, for example 2, 3, 4 or more, can also be provided along the longitudinal axis. It goes without saying that the aforementioned features and advantages apply similarly to fastening portions which are arranged on a fastening plate or which are formed thereby.

The outer wall advantageously has at least one assembly opening, which provides access to the arrangement portion from an inner side of the semi-trailer landing gear. It goes without saying that the one or more arrangement portions is/are easily accessible from an inner side of the semi-trailer landing gear when the fastening portion is formed by way of example by the outer wall itself and does not protrude laterally. The assembly opening advantageously enables access from the inner side of the semi-trailer landing gear, wherein the assembly opening is arranged substantially opposite the fastening side, in particular opposite the region of the fastening side comprising the one or more fastening portions. The assembly opening is advantageously formed as a hole or opening in the outer wall of the outer supporting tube or the transmission box opposite the fastening side, wherein the hole or the opening is expediently large enough for the fastening element to be arranged above the opening in the arrangement portion and/or for the fastening element to be reached by a tool guided through the assembly opening so as to thus fasten the semi-trailer landing gear to the further element. It goes without saying that the assembly opening, as considered along the longitudinal axis, advantageously lies substantially at the same height as the one or more fastening portions. It also goes without saying that when a plurality of fastening portions having a plurality of fastening elements and/or arrangement portions are provided, a plurality of assembly openings can also be useful accordingly, or one assembly opening is dimensioned sufficiently to be able to reach all arrangement portions.

The assembly opening advantageously can be closed by moving or displacing the inner supporting tube of the semi-trailer landing gear along the longitudinal axis. The inner supporting tube expediently has a first position or rest position, in which it is retracted and in which it has no contact with the floor or the plane of the road. In addition, the inner supporting tube advantageously has a second position or operating position, in which it is extended, wherein it has contact with the plane of the road in the second position and performs its actual supporting function. The assembly opening or the assembly openings is/are advantageously closed in the first position of the inner supporting tube. The arrangement portions therefore are no longer accessible, and the semi-trailer landing gear therefore ideally can no longer be removed, which constitutes an excellent anti-theft measure. This is true in particular for the above-described assembly variant (ii).

The outer wall expediently has a recess, which is directed towards the inner side of the semi-trailer landing gear and in which the fastening element can be arranged at least in regions in such a way that the movement of the inner supporting tube along the longitudinal axis expediently is not hindered by the fastening element. The recess can advantageously be formed as a recessed bore in order to arrange the fastening element, which is preferably formed as a screw having a countersunk head, seamlessly in the outer wall, such that a movement of the inner supporting tube along the longitudinal axis is not hindered. It goes without saying that the recess can also advantageously be formed of such a size that a nut or the like can be arranged therein, advantageously in an interlocking manner or at least in such a way that the nut can be recessed in the outer wall, such that the inner supporting tube within the outer supporting tube is not hindered during movement. Alternatively, however, provision may also be made for the fastening element or at least a portion thereof to be used as a stop, which prevents a further movement of the inner supporting tube along the longitudinal axis.

The reinforcement element and/or the doubled outer wall are expediently distanced from one another at least in regions substantially perpendicularly to the fastening side in such a way that a gap is formed. It can thus be possible where applicable to dispense with an assembly opening, since the fastening element or the fastening elements does/do not have to be arranged in the arrangement portions as considered from an inner side of the semi-trailer landing gear. The gap, substantially perpendicularly to the fastening side, preferably has a thickness of approximately 0.5 to 3, particularly preferably approximately 0.8 to 2.5, and very particularly preferably a thickness of approximately 1 to 2 cm. The gap is advantageously also just thick enough for there to be enough space for a screw head of a screw having a thread diameter of 10 and/or 12 mm. The screw can advantageously be "held" or locked by the gap so to speak, which can result in a significant simplification during assembly. It goes without saying that the specified measurements also apply when a (screw) nut or a pin, etc. is arranged in the gap.

The arrangement portion expediently has at least one access region, which enables an arrangement of the fastening element transversely to the longitudinal axis. The access region constitutes an opening so to speak of the arrangement portion, via which opening the fastening element, for example formed as a screw, pin or bolt, can be inserted.

The fastening element advantageously extends substantially away from the fastening portion, wherein the fastening portion and the fastening element are formed in particular in one piece. In other words, the fastening element is advantageously connected to the fastening portion in an integrally bonded manner, i.e. so as not to be easily releasable, for example by being welded on. It goes without saying however that the fastening element and the fastening portion can also be formed in one part, for example by means of a casting or reshaping process. As already indicated, an arrangement portion does not necessarily have to be provided for an integrally bonded connection, for example via a welding process, for fastening the fastening element to the fastening portion.

A semi-trailer landing gear which comprises a fastening portion according to the invention is provided in accordance with the invention. It goes without saying that the specified advantages of the fastening portion are not limited to the form of the outer supporting tube and the transmission box or widths thereof. Instead, provision can also be made advantageously for the semi-trailer landing gear, in particular on its outer supporting tube, to have a fastening plate, which forms at least one fastening portion having the aforementioned features and advantages. In particular, the fastening plate preferably has two fastening portions parallel to the longitudinal axis, which fastening portions each have, arranged in a row along the longitudinal axis, 3, 4, 5, 6, 8 or more fixedly (non-releasably) arranged fastening elements, for example in the form of screws or bolts.

BRIEF DESCRIPTION OF THE DRAWINGS

Further advantages and features will emerge from the following description of preferred embodiments of the semi-trailer landing gear according to the invention with reference to the accompanying drawings. Individual features of the individual embodiments can be combined with one another here within the scope of the invention.

In the drawings.

DETAILED DESCRIPTION OF THE PREFERRED EMBODIMENTS

Figure 1:
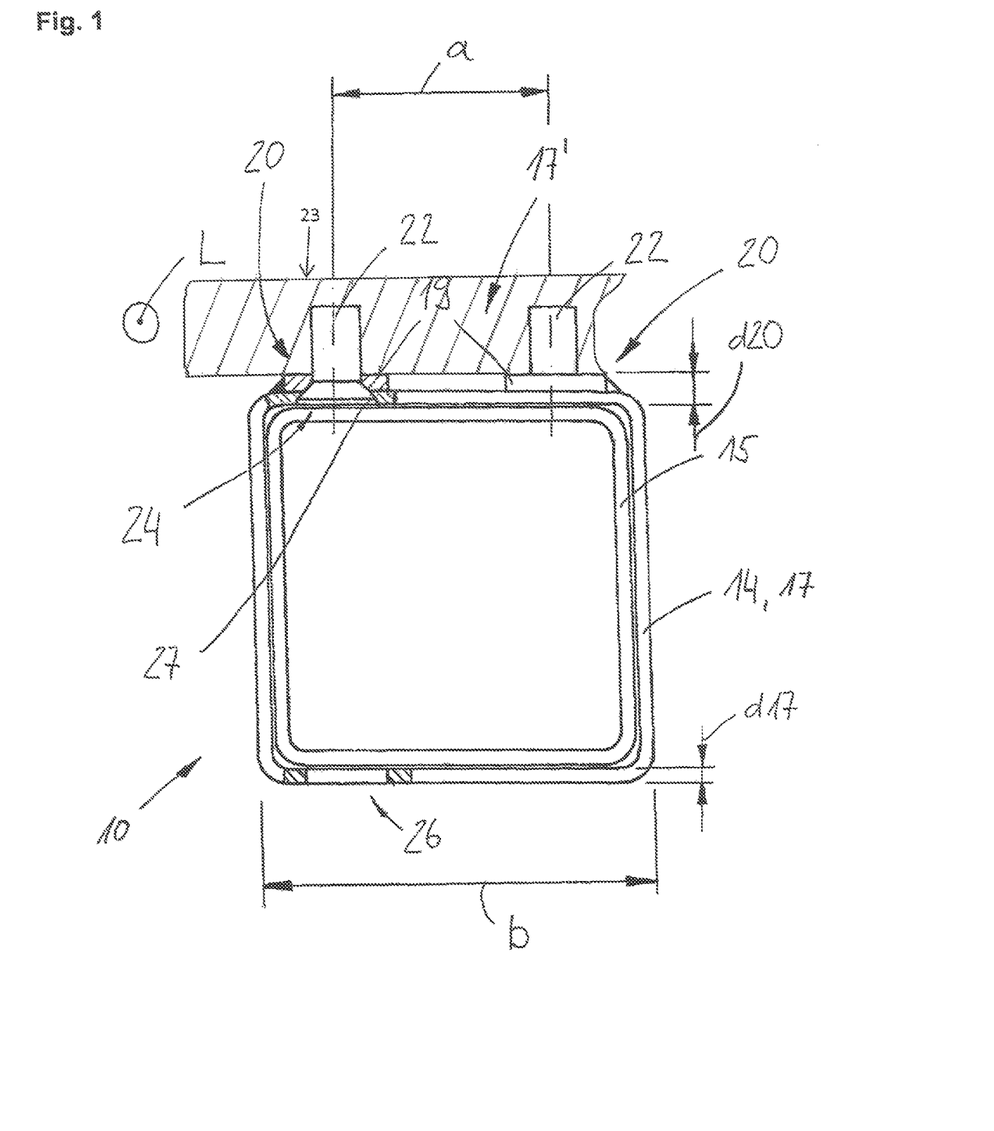
FIG. 1 shows a preferred embodiment of a semi-trailer landing gear in a sectional illustration transversely to a longitudinal axis L.

FIG. 1 shows a preferred embodiment of a semi-trailer landing gear 10 in a sectional illustration transversely to the longitudinal axis L. The semi-trailer landing gear 10 comprises an outer supporting tube 14, within which an inner supporting tube 15 is arranged. The inner supporting tube 15 is movable along the longitudinal axis L. The outer supporting tube 14 consists of an outer wall 17, which has an assembly opening 26. Opposite the assembly opening there is disposed a fastening side 17'. The fastening side 17' comprises two fastening portions 20, which are formed by the outer wall 17 in combination with two reinforcement elements 19 arranged on the outer wall 17. The fastening portions 20 have arrangement portions 24, within which fastening elements 22 (formed here as countersunk screws) are arranged, wherein the fastening elements 22 are configured to fasten and arrange the semi-trailer landing gear 10 on a further element 23 such as a vehicle frame member. The fastening elements 22 advantageously can be arranged through the recesses 27 without protruding inside the outer wall 17, in such a way that the inner supporting tube 15 is movable within the outer supporting tube 14. A thickness d20 is greater than a thickness d17 of the outer wall 17. The ratio of a distance a between the two fastening elements 22 compared with a width b of the semi-trailer landing gear 10 is less than 1.

Figure 2:
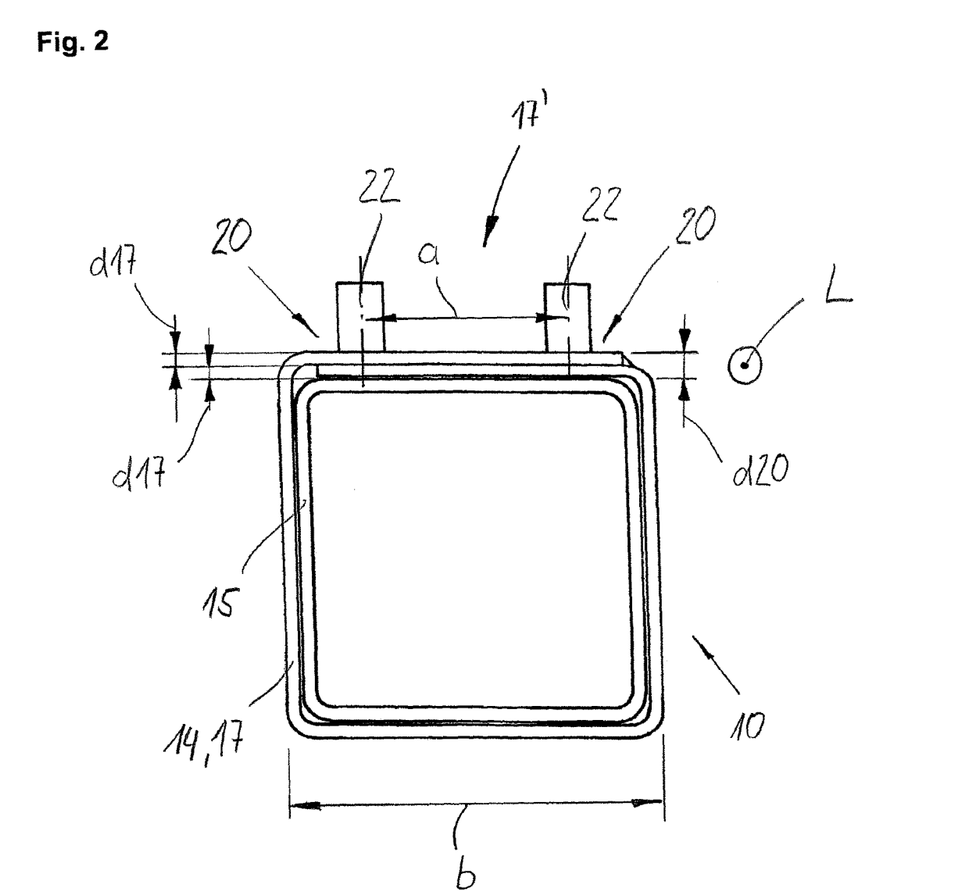
FIG. 2 shows a further preferred embodiment of a semi-trailer landing gear having an outer wall, which is formed in an overlapping manner.

FIG. 2 shows a further preferred embodiment of a semi-trailer landing gear 10, wherein an outer wall 17 is doubled in the region of a fastening side 17'. As a result of this design, two fastening portions 20 are formed, which each comprise at least one fastening element 22, these being arranged at a distance a transversely to a longitudinal axis L. The distance a is less than a width b of the outer supporting tube 14. An inner supporting tube 15 is arranged displaceably along the longitudinal axis L within the outer supporting tube 14. The outer supporting tube 14 has an outer wall 17 having a thickness d17. As a result of the embodiment of the fastening portions illustrated in FIG. 2, a thickness d20 results for the fastening portions and corresponds substantially to twice a thickness d17 of the outer wall 17.

Figure 3:
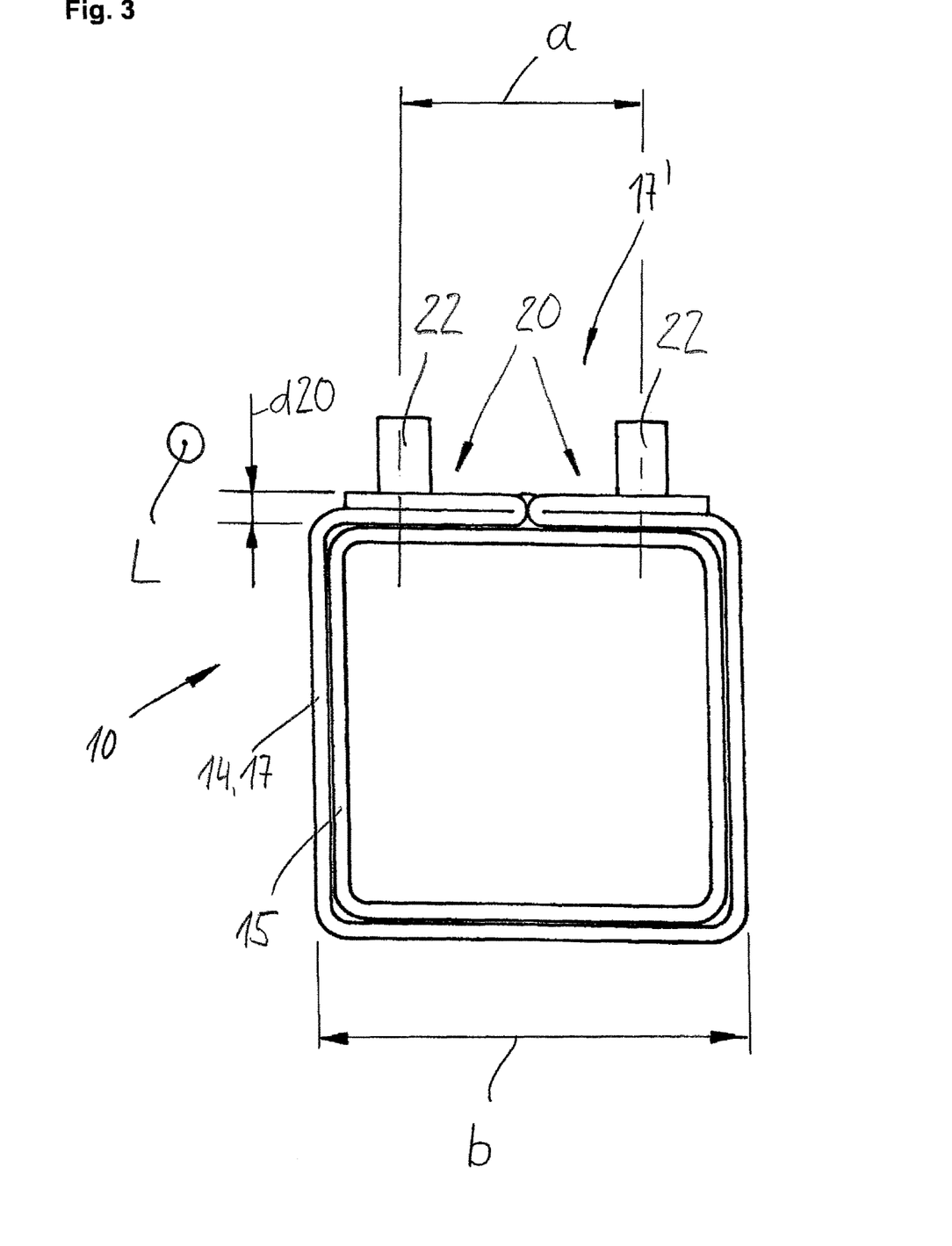
FIG. 3 shows a further preferred embodiment of a semi-trailer landing gear in a sectional illustration with a doubled outer wall.

FIG. 3 shows a further preferred embodiment of a semi-trailer landing gear 10, which in the region of a fastening side 17' has two fastening portions 20. The fastening portions 20 are formed in that an outer wall 17 has been doubled. This is made possible by a corresponding reshaping of the outer wall 17 in this region. Fastening elements 22 are arranged within the fastening portions 20. A thickness d20 of the fastening portion 20 or of the fastening portions 20 corresponds substantially to twice a wall thickness of the outer wall (not denoted here in greater detail). A width b of the semi-trailer landing gear 10 is greater than a distance a between the two fastening elements 22. In other words, the two fastening elements 22 and the fastening portions 20 lie within the width of the semi-trailer landing gear 10 or the fastening side 17'.

Figure 4:
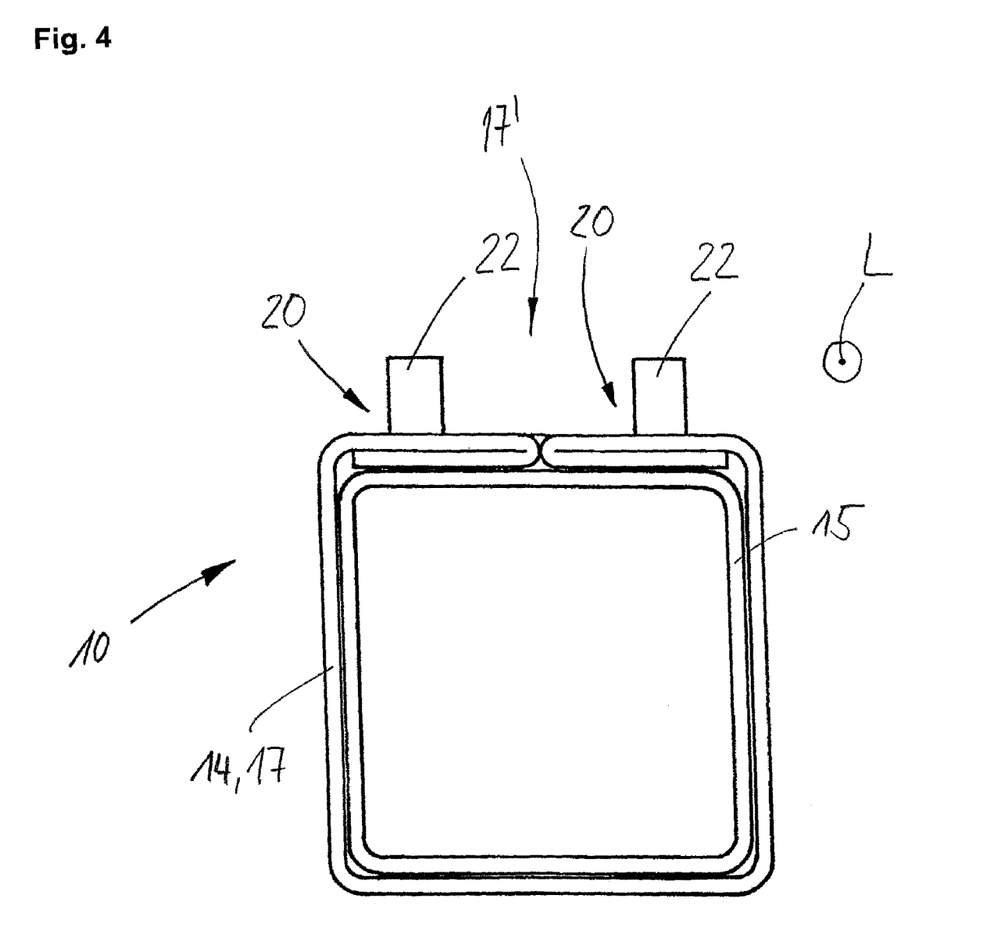
FIG. 4 shows a further preferred embodiment of a semi-trailer landing gear having a doubled outer wall.

FIG. 4 shows a further preferred embodiment of a semi-trailer landing gear 10 having a doubled outer wall 17. The embodiment illustrated in FIG. 4 corresponds substantially to the embodiment illustrated in FIG. 3, wherein merely the reshaping process has been performed differently.

Figure 5A:
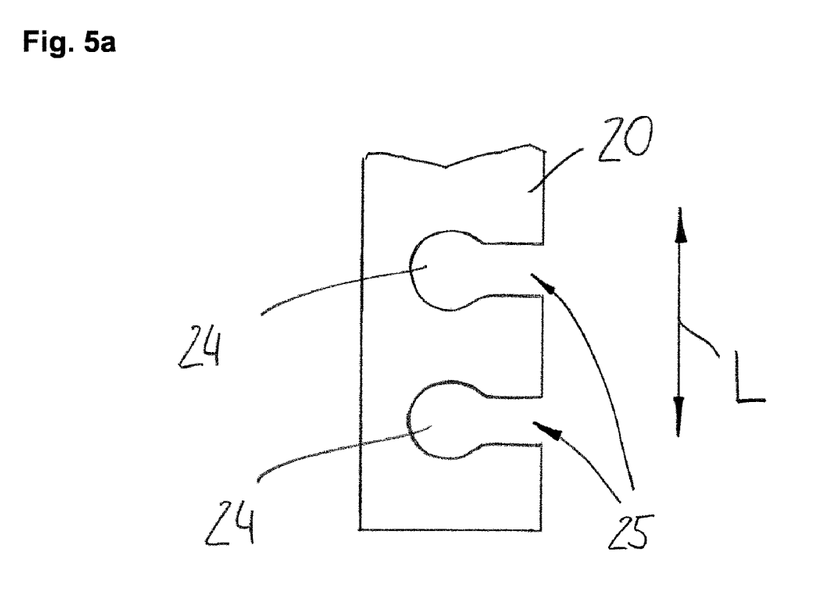
FIG. 5*a* shows a partial view of a preferred embodiment of a fastening portion, of which the arrangement portions have access regions.

FIG. 5a shows a partial view of a preferred embodiment of a fastening portion 20 with two arrangement portions 24, which are each accessible transversely to a longitudinal axis L via an access region 25.

Figure 5B:
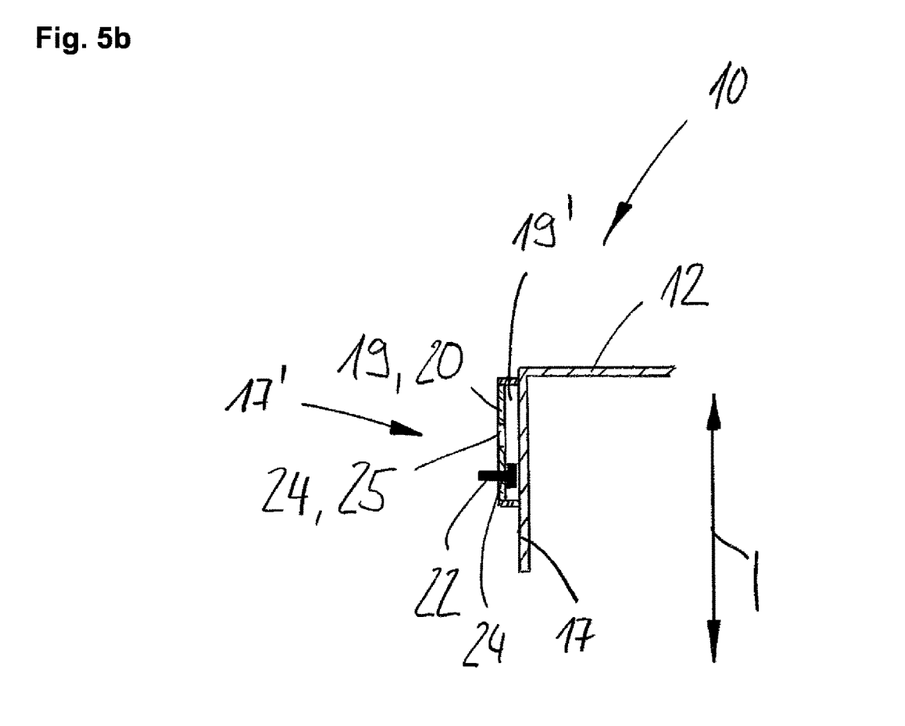
FIG. 5*b* shows a partial sectional illustration of a preferred embodiment of a semi-trailer landing gear along a fastening element arranged parallel to the longitudinal axis and arranged above an access region.

FIG. 5b shows a preferred embodiment of a semi-trailer landing gear 10 in a partial sectional illustration transversely to a longitudinal axis L. A fastening portion 20 is formed here as a reinforcement element 19, which is distanced from an outer wall 17 substantially perpendicularly to a fastening side 17', such that a gap 19' is formed. A fastening element 22 arranged in an arrangement portion 24 is also illustrated. In addition, a further arrangement portion 24 can be seen, which is accessible via an access region 25 substantially transversely to the longitudinal axis and parallel to the fastening side 17'.

Figure 6A:
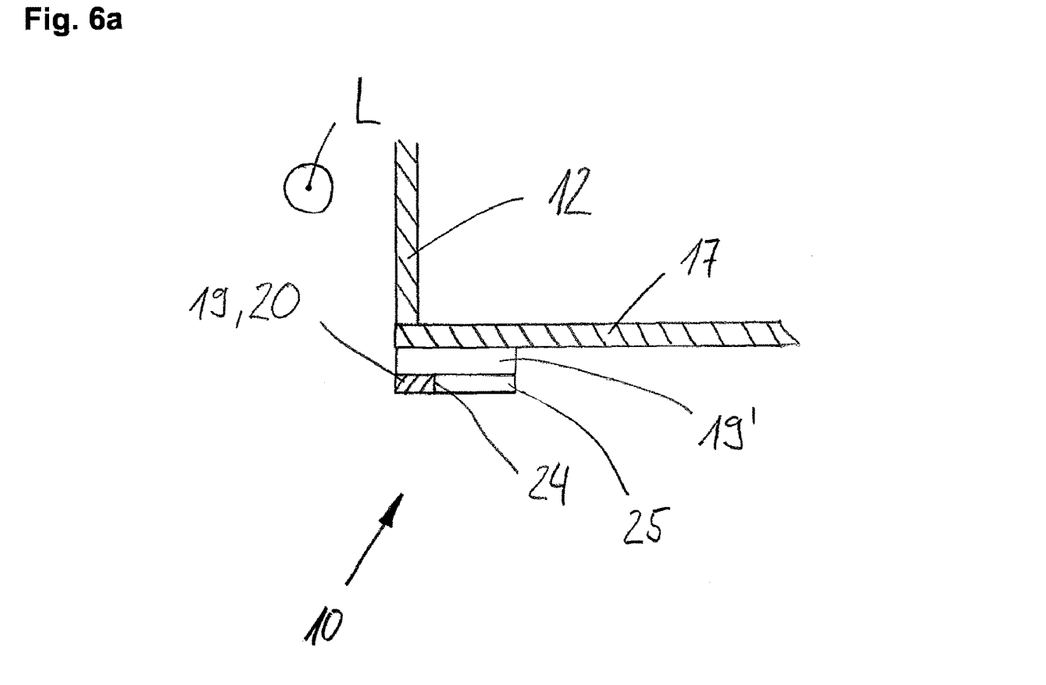
FIG. 6*a* shows a preferred embodiment of a reinforcement element having an access region, illustrated in a sectional illustration.

FIG. 6a shows a preferred embodiment of a semi-trailer landing gear 10 in a partial sectional illustration transversely to a longitudinal axis L. What is illustrated is part of a transmission box 12, on which a reinforcement element 19 formed as a fastening portion 20 is arranged. Here, a gap 19' is formed between an outer wall 17 of the transmission box 12 and the reinforcement element 19. An arrangement portion 24 can be seen as a result of the sectional illustration and is accessible via an access region 25 parallel to the outer wall 17.

Figure 6B:
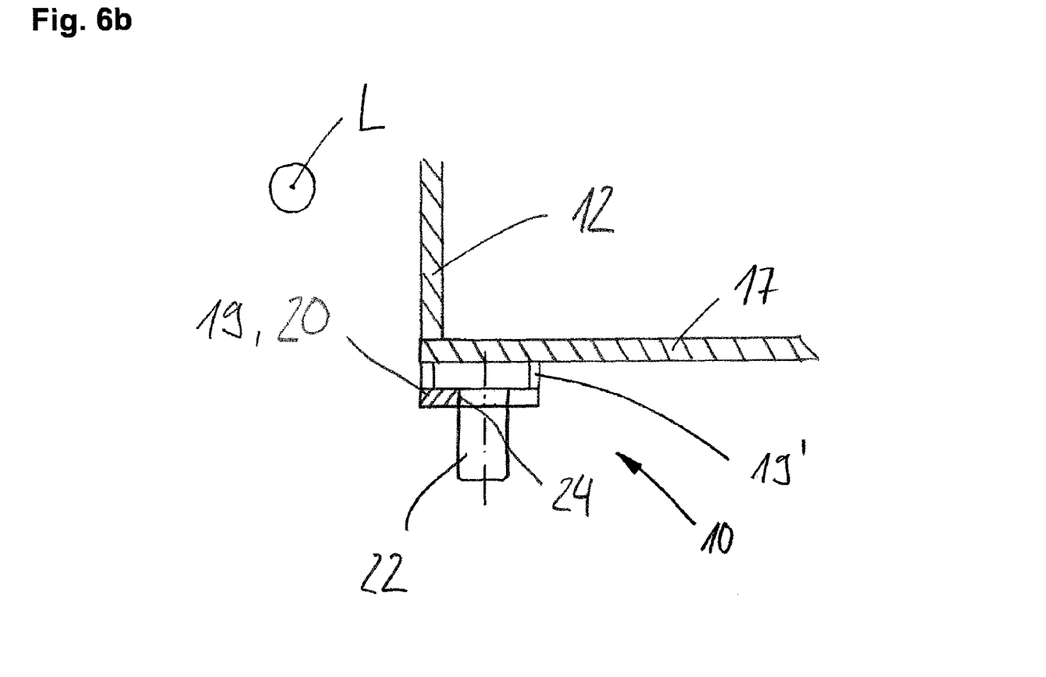
FIG. 6*b* shows the embodiment known from FIG. 6*a* of a reinforcement element with a fastening element arranged thereon.

FIG. 6b shows the embodiment known from FIG. 6a of a transmission box 12, wherein here a fastening element 22 is arranged within the arrangement portion 24. What can be clearly seen is that a head of the fastening element 22 formed as a screw advantageously fits in a precise manner into the gap 19'.

Figure 7:
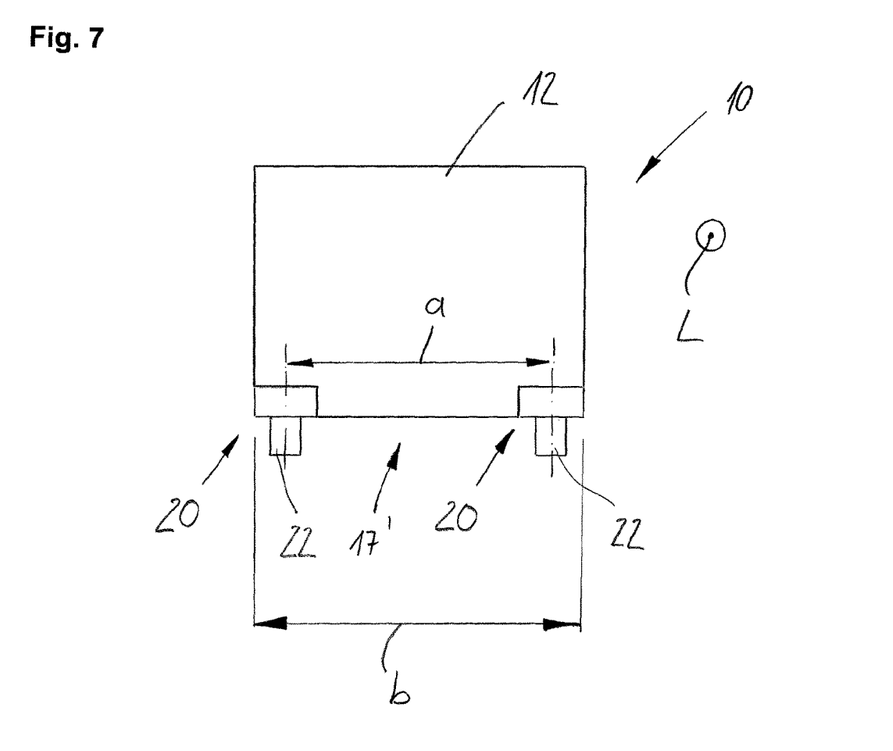
FIG. 7 shows a plan view of a preferred embodiment of a transmission box having two fastening portions arranged in the region of the fastening side.

FIG. 7 shows a preferred embodiment of a semi-trailer landing gear 10 along a longitudinal axis L. What can be seen is a transmission box 12 in a plan view, which has two fastening portions 20 on a fastening side 17', each of said fastening portions having at least one fastening element 22. It can be clearly seen that a width of the transmission box 12 or fastening side 17' thereof is greater than a distance a between the fastening elements 22.

Figure 8A:
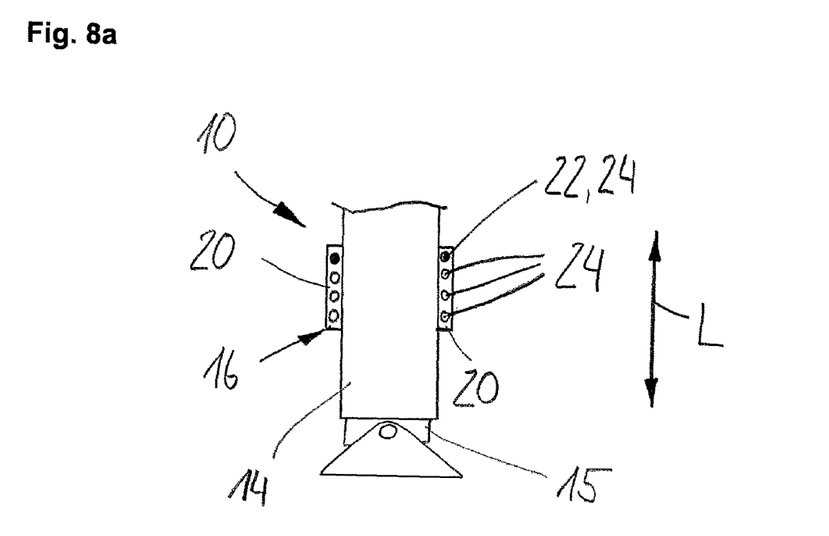
FIG. 8a shows a schematic illustration of a preferred embodiment of a semi-trailer landing gear in a side view.

FIG. 8a shows a preferred embodiment of a semi-trailer landing gear 10 in a side view. The semi-trailer landing gear 10 comprises an outer supporting tube 14, within which an inner supporting tube 15 is arranged and is movable along a longitudinal axis L. A support foot (without reference sign) is arranged on the inner supporting tube 15. A fastening plate 16 is arranged on the outer supporting tube 14 and has two fastening portions 20 with arrangement portions 24 arranged in a row. A fastening element 22 is arranged on each uppermost arrangement portion 24.

Figure 8B:
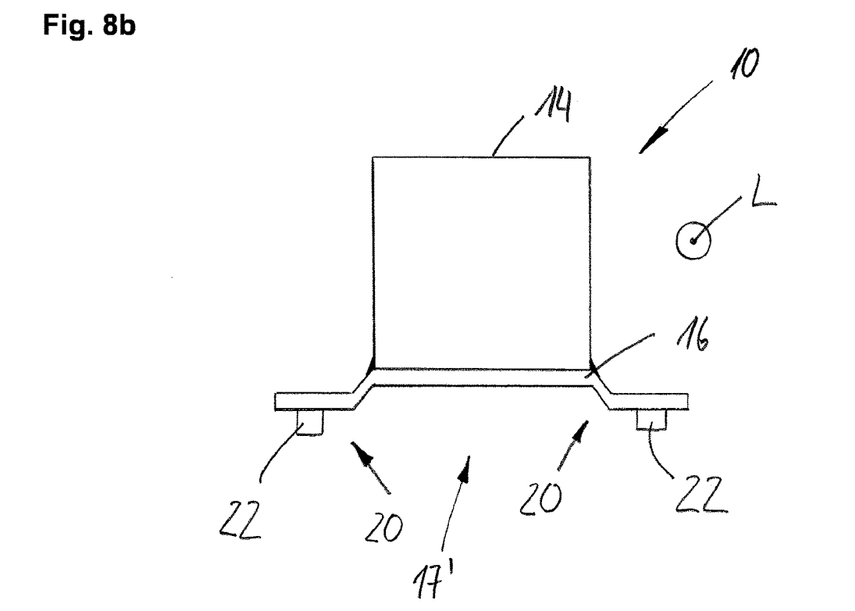
FIG. 8b shows a preferred embodiment of a fastening plate having two fastening portions arranged on an outer supporting tube.

FIG. 8b shows a further preferred embodiment of a semi-trailer landing gear 10 along a longitudinal axis L. What can be seen is an outer supporting tube 14, on which a fastening plate 16 is arranged, which forms a fastening side 17'. The fastening plate 16 has two fastening portions 20, each having at least one fastening element 22. The fastening side 17' does not necessarily have to be flat or smooth, but can also be stepped for example, as in this case.

Figure 8C:
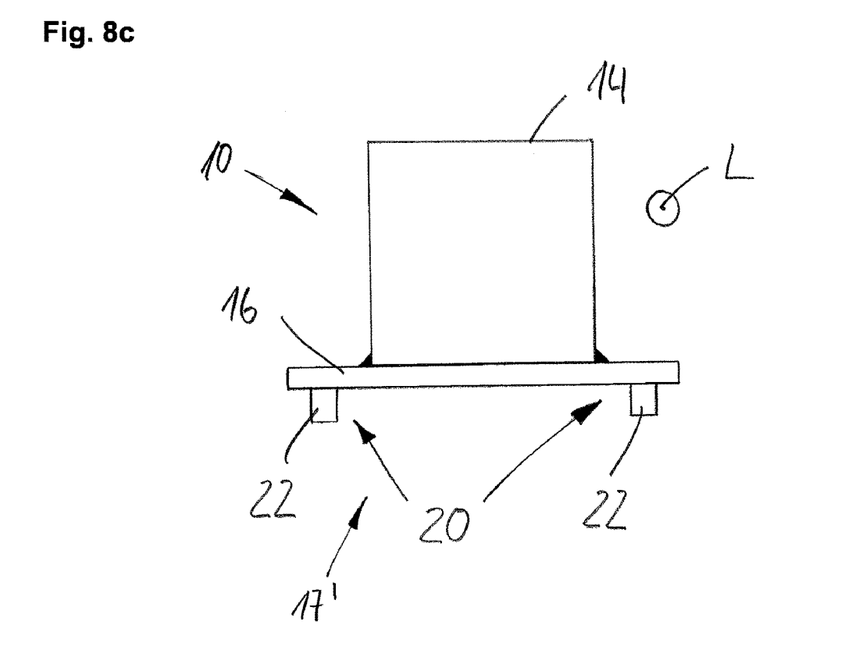
FIG. 8c shows a further preferred embodiment of a fastening plate having two fastening portions arranged on an outer supporting tube.

FIG. 8c shows a further preferred embodiment of a semi-trailer landing gear 10 along a longitudinal axis L. A fastening plate 16 formed as a straight plate and having two fastening portions 20 is formed on an outer supporting tube 14. The fastening portions 20 each comprise at least one fastening element 22 on a fastening side 17' of the fastening plate 16.

LIST OF REFERENCE SIGNS 10 semi-trailer landing gear
12 transmission box
14 outer supporting tube
15 inner supporting tube
16 fastening plate
17 outer wall
17' fastening side
19 reinforcement element
19' gap
20 fastening portion
22 fastening element
24 arrangement portion
25 access region
26 assembly opening
27 recess
L longitudinal axis
a distance
b width
d20 wall thickness fastening portion
d17 wall thickness outer wall

The invention claimed is:

1. A semi-trailer landing gear, comprising:
a housing configured to fasten to a further element of a vehicle, wherein the semi-trailer landing gear extends along a longitudinal axis, the housing including an outer wall, the outer wall including a fastening side having at least two fastening portions located in the region of the fastening side, wherein each of the at least two fastening portions are configured to at least one of fasten and arrange the semi-trailer landing gear on the further element;
wherein each fastening portion of the at least two fastening portions includes at least one of at least one fastening element for fastening the at least one fastening portion and at least one arrangement portion for arranging the at least one fastening portion, and wherein a ratio of a distance between at least one of the fastening elements and the arrangement portions of the two fastening portions transversely to the longitudinal axis of the semi-trailer landing gear to a width of the housing in this region is less than 1, wherein the outer wall has at least one assembly opening that provides an access to the arrangement portion from an inner side of the semi-trailer landing gear, and wherein the assembly opening is configured to be closed by moving an inner supporting tube of the semi-trailer landing gear along the longitudinal axis, and wherein the assembly opening is closed in a first or rest position of the inner supporting tube.

2. The semi-trailer landing gear as claimed in claim 1, wherein the fastening portion is formed by at least one of the outer wall and the reinforcement element, which is arranged on the fastening side.

3. The semi-trailer landing gear as claimed in claim 2, wherein a wall thickness of the fastening portion is greater than a wall thickness of the outer wall, and wherein the wall thickness of the fastening portion includes at least one of the reinforcement element and a reshaping of the outer wall, wherein the reshaping results in a doubling of the outer wall.

4. The semi-trailer landing gear as claimed in claim 1, wherein the wall thickness of the fastening portion is about 1.1 to 3.5 times greater than a wall thickness of the outer wall.

5. The semi-trailer landing gear as claimed in claim 4, wherein a ratio of a distance between at least one of the fastening elements and the arrangement portions of two fastening portions transversely to the longitudinal axis of the semi-trailer landing gear to a width of the housing in this region is about 0.7 to 0.9.

6. The semi-trailer landing gear as claimed in claim 1, wherein a wall thickness of the fastening portion is greater than a wall thickness of the outer wall, and wherein the wall thickness of the fastening portion includes at least one of the reinforcement element and a reshaping of the outer wall, wherein the reshaping results in a doubling of the outer wall.

7. The semi-trailer landing gear as claimed in claim 1, wherein a wall thickness of the fastening portion is about 1.1 to 3.5 times greater than a wall thickness of the outer wall.

8. The semi-trailer landing gear as claimed in claim 1, wherein a ratio of a distance between at least one of the fastening elements and the arrangement portions of two fastening portions transversely to the longitudinal axis of the semi-trailer landing gear to a width of the housing in this region is about 0.7 to 0.9.

9. The semi-trailer landing gear as claimed in claim 1, wherein the outer wall has a recess that is closed toward the inner side of the semi-trailer landing gear and in which the fastening element can be arranged at least in regions in such a way that the movement of the inner supporting tube along the longitudinal axis is not hindered by the fastening element.

10. The semi-trailer landing gear as claimed in claim 1, wherein the arrangement portion has at least one access region that enables arrangement of the fastening element transversely to the longitudinal axis.

11. The semi-trailer landing gear as claimed in claim 1, wherein the fastening element extends substantially away from the fastening portion, and wherein the fastening portion and the fastening element are configured as one piece.

12. The semi-trailer landing gear as claimed in claim 1, wherein the housing comprises an outer supporting tube.

13. A semi-trailer landing gear, comprising:
a housing configured to fasten to a further element of a vehicle, wherein the semi-trailer landing gear extends along a longitudinal axis, the housing an outer wall, the outer wall including a fastening side having at least two fastening portions located in the region of the fastening side, wherein each of the at least two fastening portions are configured to at least one of fasten and arrange the semi-trailer landing gear on the further element;
wherein each fastening portion of the at least two fastening portions includes at least one of at least one fastening element for fastening the at least one fastening portion and at least one arrangement portion for arranging the at least one fastening portion, and wherein a ratio of a distance between at least one of the fastening elements and the arrangement portions of the two fastening portions transversely to the longitudinal axis of the semi-trailer landing gear to width of the housing in this region is less than 1; and
wherein the outer wall has at least one assembly opening that provides an access to the arrangement portion from an inner side of the semi-trailer landing gear.

14. The semi-trailer landing gear as claimed in claim 13, wherein the assembly opening is configured to be closed by moving an inner supporting tube of the semi-trailer landing gear along the longitudinal axis, and wherein the assembly opening is closed in a first or rest position of the inner supporting tube.

15. The semi-trailer landing gear as claimed in claim 14, wherein the outer wall has a recess that is oriented toward the inner side of the semi-trailer landing gear and in which the fastening element can be arranged at least in regions in such a way that the movement of the inner supporting tube along the longitudinal axis is not hindered by the fastening element.

16. The semi-trailer landing gear as claimed in claim 15, wherein the reinforcement element and at least one of the outer wall and the doubled outer walls are distanced from one another at least in regions substantially perpendicularly to the fastening side in such a way that a gap is formed.

17. The semi-trailer landing gear as claimed in claim 15, wherein the arrangement portion has at least one access region that enables arrangement of the fastening element transversely to the longitudinal axis.

18. The semi-trailer landing gear as claimed in claim 17, wherein the fastening element extends substantially away from the fastening portion, and wherein the fastening portion and the fastening element are configured as one piece.

19. A semi-trailer landing gear, comprising:
a housing configured to fasten to a further element of a vehicle, wherein the semi-trailer landing gear extends along a longitudinal axis, the housing including an outer wall, the outer wall including a fastening side having at least two fastening portions located in the region of the fastening side, wherein each of the at least two fastening portions are configured to at least one of fasten and arrange the semi-trailer landing gear on the further element;
wherein each fastening portion of the at least two portions includes at least one of at least one fastening element for fastening the at least one fastening portion and at least one arrangement portion for arranging the at least one fastening portion, wherein a ratio of a distance between at least one of the fastening elements and the arrangement portions of the two fastening portions transversely to the longitudinal axis of the semi-trailer landing gear to a width of the housing in this region is less than 1, and wherein the reinforcement element and at least one of the outer wall and the doubled outer walls are distanced from one another at least in regions substantially perpendicularly to the fastening side in such a way that a gap is formed.

20. A semi-trailer landing gear, comprising:
a housing configured to fasten to a further element of a vehicle, wherein the semi-trailer landing gear extends along a longitudinal axis, the housing including an outer wall, the outer wall including a fastening side, at least two fastening portions located in the region of the fastening side, wherein each of the at least two fastening portions are configured to at least one of fasten and arrange the semi-trailer landing gear on the further element;
wherein each fastening portion of the at least two fastening portions includes at least one of at least one fastening element for fastening the at least one fastening portion and at least one arrangement portion for arranging the at least one fastening portion, and wherein a ratio of a distance between at least one of the fastening elements and the arrangement portions of the two fastening portions transversely to the longitudinal axis of the semi-trailer landing gear to a width of the housing in this region is less than 1;
wherein the fastening portion is formed by at least one of the outer wall and the reinforcement element, which is arranged on the fastening side;
wherein a wall thickness of the fastening portion is greater than a wall thickness of the outer wall, and wherein the wall thickness of the fastening portion includes at least one of the reinforcement element and a reshaping of the outer wall, wherein the reshaping results in a doubling of the outer wall;
wherein the wall thickness of the fastening portion is about 1.1 to 3.5 times greater than a wall thickness of the outer wall;
wherein a ratio of a distance between at least one of the fastening elements and the arrangement portions of two fastening portions transversely to the longitudinal axis of the semi-trailer landing gear to a width of the housing in this region is about 0.7 to 0.9;
wherein the outer wall has at least one assembly opening that provides an access to the arrangement portion from an inner side of the semi-trailer landing gear;
wherein the assembly opening is configured to be closed by moving an inner supporting tube of the semi-trailer landing gear along the longitudinal axis, and wherein the assembly opening is closed in a first or rest positon of the inner supporting tube;
wherein the outer wall has a recess that is oriented toward the inner side of the semi-trailer landing gear and in which the fastening element can be arranged at least in regions in such a way that the movement of the inner supporting tube along the longitudinal axis is not hindered by the fastening element;
wherein the reinforcement element and at least one of the outer wall and the doubled outer walls are distanced from one another at least in regions substantially perpendicularly to the fastening side in such a way that a gap is formed;
wherein the arrangement portion has at least one access region that enables arrangement of the fastening element transversely to the longitudinal axis;
wherein the fastening element extends substantially away from the fastening portion, and wherein the fastening portion and the fastening element are configured as one piece, and
wherein the housing comprises an outer supporting tube.

* * * * *

UNITED STATES PATENT AND TRADEMARK OFFICE
CERTIFICATE OF CORRECTION

PATENT NO. : 10,246,062 B2
APPLICATION NO. : 15/111579
DATED : April 2, 2019
INVENTOR(S) : Wallmeier et al.

Page 1 of 1

It is certified that error appears in the above-identified patent and that said Letters Patent is hereby corrected as shown below:

In the Specification

Column 1, Line 27:
"or" (1ˢᵗ occurrence) should read — of —

Column 3, Line 36:
After "the" insert -- at --

In the Claims

Column 10, Claim 13, Line 46:
After "housing" insert -- including --

Column 10, Claim 13, Line 60:
After "to" insert -- a --

Column 11, Claim 19, Line 34:
After "two" insert -- fastening --

Column 12, Claim 20, Line 34:
"positon" should read — position —

Column 12, Claim 20, Line 53:
"," should read — ; —

Signed and Sealed this
Eighth Day of October, 2019

Andrei Iancu
*Director of the United States Patent and Trademark Office*